United States Patent [19]

Magee et al.

[11] 4,012,266

[45] Mar. 15, 1977

[54] METHOD AND APPARATUS FOR FILAMENT WINDING ON A CORRUGATED FORM TO PRODUCE A CYLINDRICAL CORRUGATED GLASS FIBER PART

[76] Inventors: Donald L. Magee, Rte. 8, Lincoln, Nebr. 68506; Walter A. Bailey, 3440 N. 66th St., Lincoln, Nebr. 68507; Roger P. Bailey, 4131 Clifford Drive, Lincoln, Nebr. 68506

[22] Filed: Oct. 31, 1974

[21] Appl. No.: 519,547

Related U.S. Application Data

[63] Continuation of Ser. No. 282,255, Aug. 21, 1972, abandoned.

[52] U.S. Cl. .............................. 156/173; 156/175; 156/189; 156/195; 156/276
[51] Int. Cl.² ..................................... B65H 81/00
[58] Field of Search ............... 156/176, 173–175, 156/171, 425, 450, 189, 187, 356, 195, 276, 578; 242/7.21, 7.23, 221; 222/145; 118/304; 239/311; 427/426; 138/141, 121, 122, 129

[56] References Cited

UNITED STATES PATENTS

| | | | |
|---|---|---|---|
| 2,823,143 | 2/1958 | Upperman | 427/426 |
| 2,843,153 | 7/1958 | Young | 156/175 |
| 3,379,591 | 4/1968 | Bradley | 156/173 |
| 3,492,187 | 1/1970 | Hirtzer | 156/446 |
| 3,560,065 | 2/1971 | Shobert et al. | 308/328 |
| 3,616,000 | 10/1971 | Butzow | 156/173 |
| 3,616,070 | 10/1971 | Lemelson | 156/173 |
| 3,623,930 | 11/1971 | Grosh | 156/173 |
| 3,629,028 | 12/1971 | McLarty et al. | 156/175 |
| 3,655,468 | 4/1972 | Bastone et al. | 156/173 |
| 3,673,029 | 6/1972 | McLarty | 156/175 |
| 3,706,615 | 12/1972 | Nishiyama et al. | 156/173 |
| 3,819,450 | 6/1974 | Kunz | 156/173 |

Primary Examiner—Charles E. Van Horn
Assistant Examiner—Michael W. Ball
Attorney, Agent, or Firm—Lowe, Kokjer, Kircher, Wharton & Bowman

[57] ABSTRACT

The method of filament winding on a corrugated form to thereby form a cylindrical corrugated part includes the steps of
 causing relative motion between said form and a glass fiber applicator,
 wrapping a glass fiber band with a resin coating thereon on said form in a spiral pattern without bridging over said corrugations in said form,
 permitting said glass fiber to harden on said form thereby forming said corrugated part, and
 removing said hardened part from said form after a predetermined period of time.

The apparatus has a collapsible corrugated form arranged with its axis of rotation substantially horizontal. An applicator is supported for reciprocating fore and aft movement with respect to preselected surface(s) of the form. Proper orientation of the applicator with respect to the form permits a band of resin coated glass fiber strands to be spirally wrapped on the corrugated form without bridging over the corrugations. Simultaneously, the applicator has the facility for chopping and spraying glass fiber on the form so that same contacts with the resin coat on the fibers. The applicator is moved fore and aft on an endless chain and covers the form after a preselected number of fore and aft movements.

8 Claims, 12 Drawing Figures

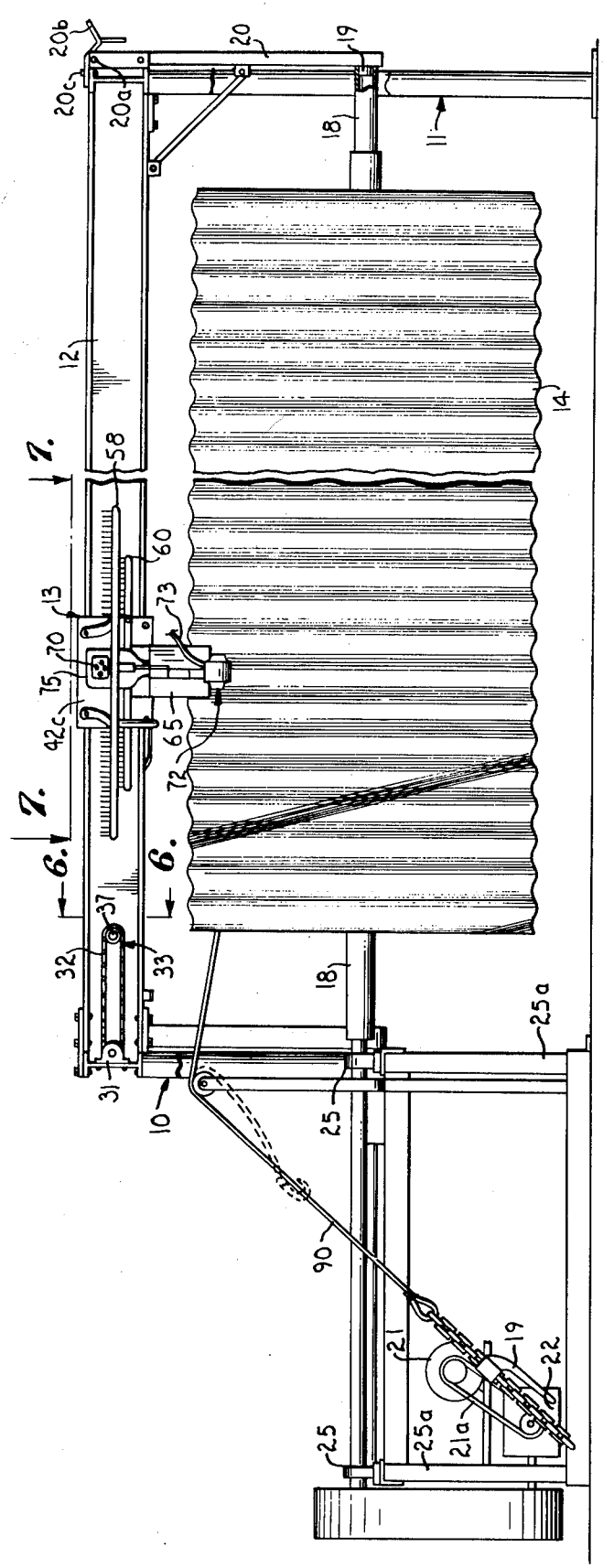
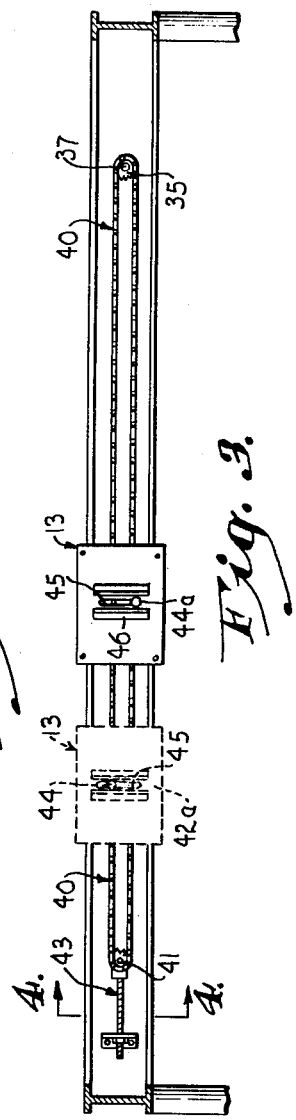
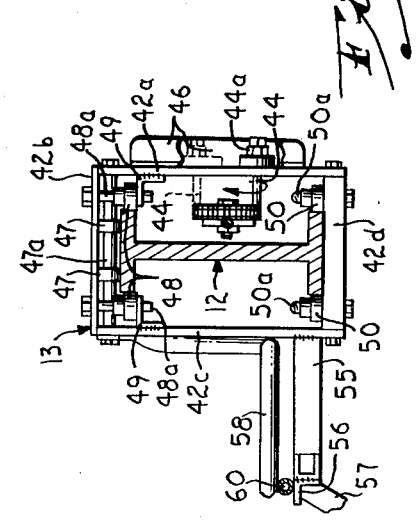

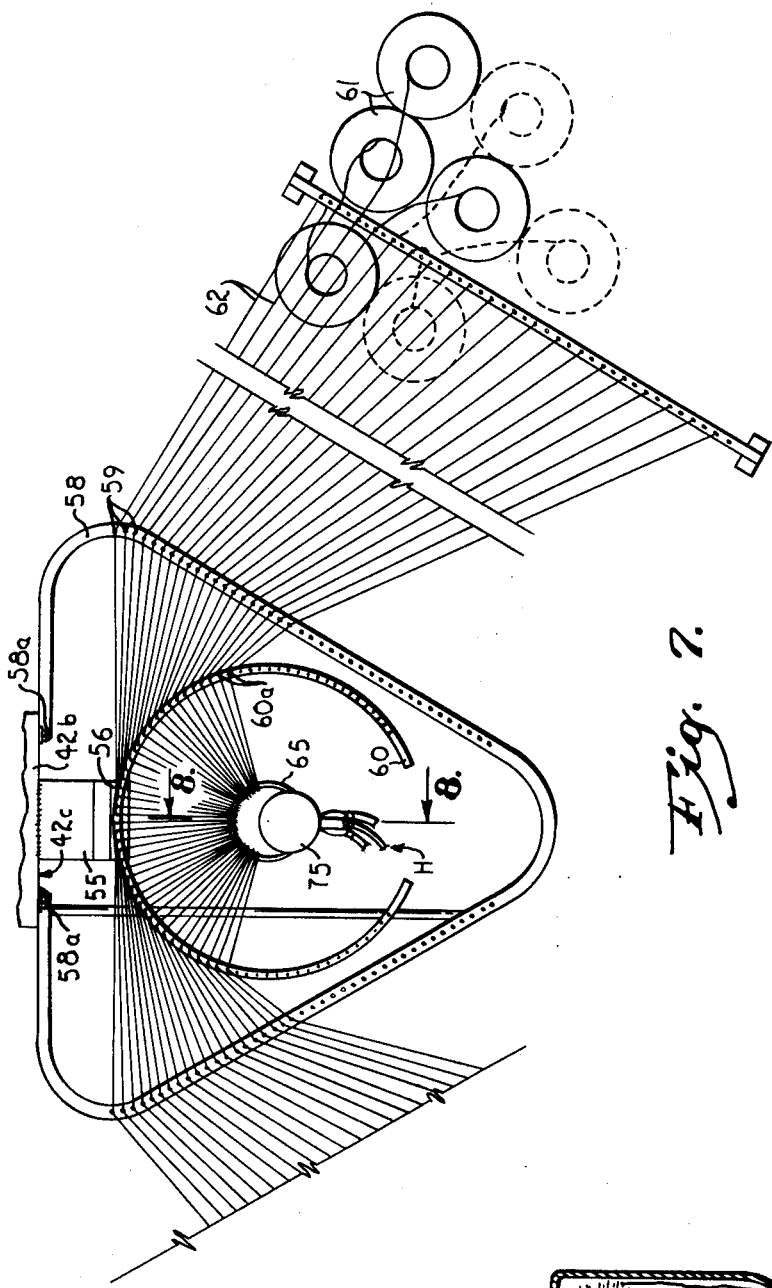
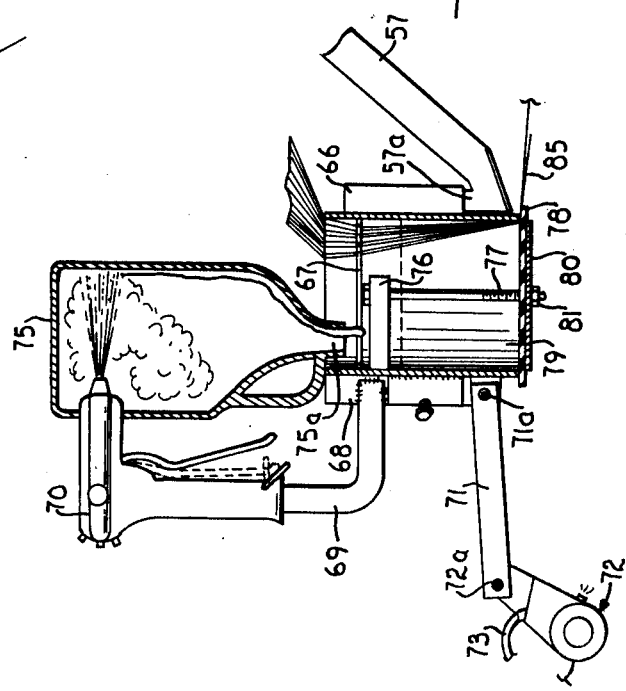
Fig. 7.
Fig. 8.

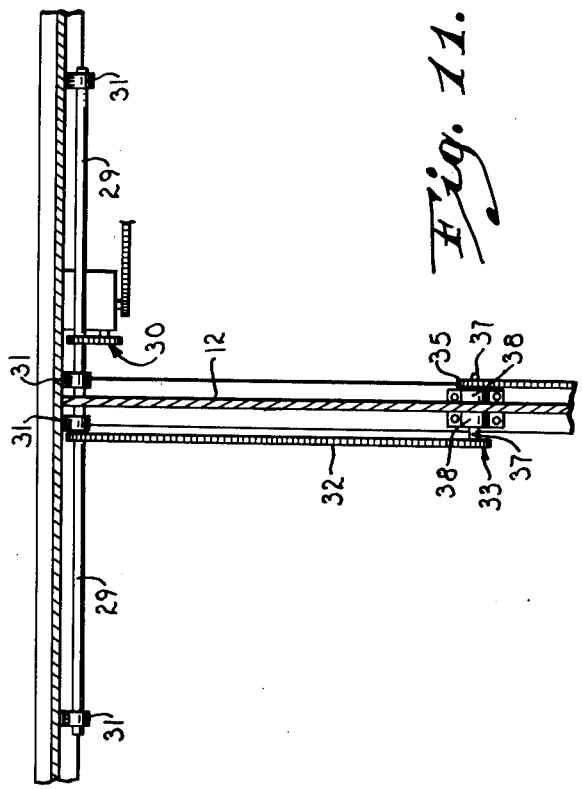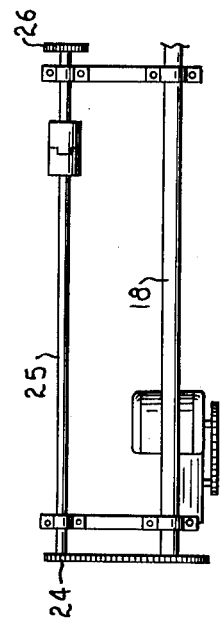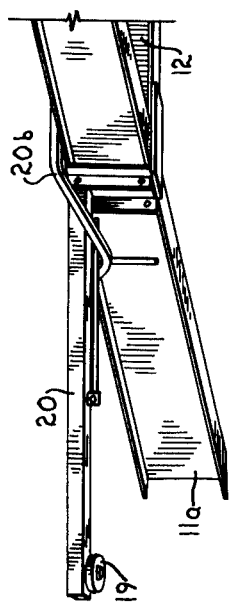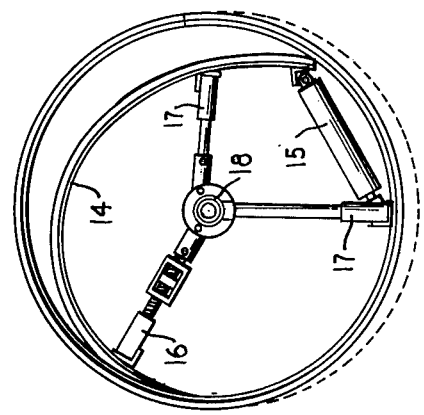

METHOD AND APPARATUS FOR FILAMENT WINDING ON A CORRUGATED FORM TO PRODUCE A CYLINDRICAL CORRUGATED GLASS FIBER PART

This is a continuation of application Ser. No. 282,255, filed Aug. 21, 1972, and now abandoned.

BACKGROUND AND BRIEF DESCRIPTION OF THE INVENTION

Prior art glass fiber filament winders are often complex and extremely costly. Some filament winders apply glass fiber to a rotating form with the form and associated fiber wrap being passed through a trough of hand-mixed resin and catalyst to effect the hardening of the formed part. Often, the filament winder is controlled by data processing equipment to carefully gauge the wrapping process during the covering of the particular form. Accordingly, the operator of the filament winder was generally required to have extensive training in both the glass fiber arts and in computer control machinery thusly severely decreasing the available number of qualified operators.

The subject invention pertains both to the method and apparatus for winding resin coated glass fiber band(s) on corrugated forms to thereby form hardened cylindrical corrugated glass fiber parts. The device includes a collapsible cylindrical rotatable corrugated form that is supported for rotation between two end support sections. An I-beam spans the two end sections directly above the cylindrical corrugated form and has an endless chain rotatably mounted on one side of the vertical web of the I-beam. The chain and the cylindrical corrugated form are rotated at preselected speeds. The applicator is connected with the endless chain on the opposite side of the vertical web of the I-beam and is movable fore and aft of the length of the corrugated cylindrical form surface within the limits prescribed by the movement of the chain.

The applicator includes a resin pot with a resin and catalyst liquefier mounted on the top thereof. The upper portion of the pot accepts the several strands of glass fiber with the lower end of the pot having a rubber diaphragm-like wiping surface that is positionable to control the amount of resin and catalyst coat being applied to the glass fiber strands as they are passed out from the lower pot portion in the form of a band.

The end portion of the fibers are tied to the inside of the rotatable corrugated form with the applicator being started at the aftmost position with respect to the form and the supporting I-beam. The form is then rotated and the applicator moved forwardly by the movement of the endless chain. The applicator applies the glass fiber band to the corrugated form in such a manner so that the strands of the glass fiber band do not bridge over the corrugations and proceed to wrap the glass fiber band around the form in a spiral fashion. The applicator will include a glass fiber chopper and a sprayer so that chopped glass fibers may be applied directly onto the coated resin bands as the wrapping proceeds around the corrugated form. By properly selecting the number of links in the chain and the speed of form rotation in conjunction with the angle of application of the bands to the form, the spiral bands will abut each other during the winding process and will not overlap except where required by the spiral wrapping process. In this fashion, the wrapping continues with the chopped glass fibers being sprayed thereon at selected time periods until the form is completely coated with the combination of bands and chopped glass fiber. After appropriate squeegee action by the apparatus operator, the material is allowed to harden a preselected length of time. Then, the form is collapsed, the hardened corrugated product loosened from the form, and the part removed either by pulling with an electric winch or by hand-walking the hardened part from the form. The process and apparatus is then immediately ready for re-use with a minimal amount of preparation necessary. The subject method and apparatus has eliminated many complex and expensive features heretofore required to accomplish the wrapping of corrugated form of glass fiber bands. This has, in part, been made possible by the orientation of the applicator head, the speed of the form, and the movement of the applicator by the associated endless chain.

The unique method includes the steps of causing relative motion between said form and a glass fiber applicator, wrapping a glass fiber band with a resin coating thereon on said form in a spiral pattern without bridging over said corrugations in said form, permitting said glass fiber to harden on said form thereby forming said corrugated part, and removing said hardened part from said form after a predetermined period of time.

One of the primary objects of the invention is to provide a uniquely constructed filament winding machine. As a corollary thereto, an equally important object is to provide a unique method for continuously winding glass fiber on corrugated forms.

Another object of the invention is to provide uniquely constructed filament winder that is simple to operate. It is a feature of the invention that unskilled labor can be hired who still require only a minimum amount of instruction and education prior to operating the subject filament winder.

Another object of the invention is to provide a unique method for filament winding corrugated forms to thereby form cylindrical corrugated hardened parts, said method comprising the steps of rotating said form, wrapping a glass fiber band with a resin coating thereon on said form in a spiral pattern without bridging over said corrugations in said form, permitting said glass fiber to harden on said form after a predetermined period of time.

A further object of the invention is to provide uniquely constructed filament winder of the character described which includes a novel glass fiber applicator. It is a feature of the applicator that both chopped glass fiber and a band of glass fiber strands may be applied simultaneously to the corrugated form.

A still further object of the invention is to provide a filament winder of the character described immediately above which includes a novel support means and chain drive mechanism for the glass fiber applicator. It is an important feature of the invention that the applicator fore and aft speed in relation to the form rotational movement and travel distance are correlated to enable the form to be optimally wrapped.

Another very significant object of the invention is to provide a unique filament winder capable of winding glass fibers on and around a corrugated form without bridging over the corrugations during the winding process.

A further object is to provide a winder of the character described immediately above that is capable of filament winding continuous corrugations by making spiral wraps over the surface of the corrugated form.

Another object of the invention is to provide, in glass fiber filament winders, a unique method for maintaining a proper amount of calcium carbonate in liquid resin which is to be applied to the other glass fibers during the winding process.

Another object of the invention is to provide in a filament winder of the character described, a unique means for applying resin and catalyst to glass fiber strands. The means includes a novel aerosol liquifier structure in combination with a glass fiber strand wetting pot and wiper. In this manner, the amount of resin and catalyst combination can be varied a controlled amount as the glass band (or chopped glass fiber) is being applied to the corrugated form.

A further object of the invention is to provide a unique method and apparatus for continuously winding a band of glass fiber strands on a continuously corrugated form and to have the ability to alter or change the winding pattern on the form by changing the rotative speed of the corrugated form.

A further object of the invention is to provide a unique method and apparatus for varying the volume of catalyst and resin that is applied to glass fiber during a continuous winding process.

A still further object of the invention is to provide a unique method and apparatus that permits a simultaneous application of chopped glass fiber and a plurality of glass fiber bands from the same applicator to a form during the continuous winding of same.

A further object is to provide a filament winder for continuously winding glass fiber filament on corrugated forms which includes a unique means for moving the filament applicator with respect to the form. It is an important feature of the invention that the rotational speed of the form, and the length of the endless chain which drives the applicator are interrelated in a unique manner to insure that a band which comprises a plurality of glass fiber strands is properly laid on the rotating form.

These and other objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 1 is a side elevational view of the filament winder apparatus with the I-beam and cylindrical form being shown in an indeterminate length and with portions thereof broken away to illustrate certain hidden features;

FIG. 3 is a side sectional view taken generally along the line of 3—3 of FIG. 2 in the direction of the arrows;

FIG. 4 is a sectional view taken generally along the line 4—4 of FIG. 3 in order to more clearly illustrate the carriage structure for the applicator;

FIG. 7 is a top plan view of the applicator and showing a plurality of glass fiber strands being directed into the pot holding the catalyst and resin mixture;

FIG. 8 is a sectional view taken generally along the line 8—8 of FIG. 7 in the direction of the arrows and showing the aerosol liquifying structure and the means by which the pot operates to wet the strands of glass fiber prior to being applied to the form;

FIG. 9 is a perspective view of the front portion of the winder apparatus shown in FIG. 2 indicating how the forward bearing support structure is swung out of the way to permit the hardened part to be removed from the form;

FIG. 10 is an end elevational view of the corrugated collapsible form with the solid lines indicating the collapsed position of the form while the broken lines and hardened part indicate the part forming position of the form;

FIG. 11 is a reduced sectional view taken generally along the line 11—11 of FIG. 6 in the direction of the arrows; and FIG. 12 is a partial top plan view of the shafts for rotating the form and the applicator moving endless chain.

Figure 5:
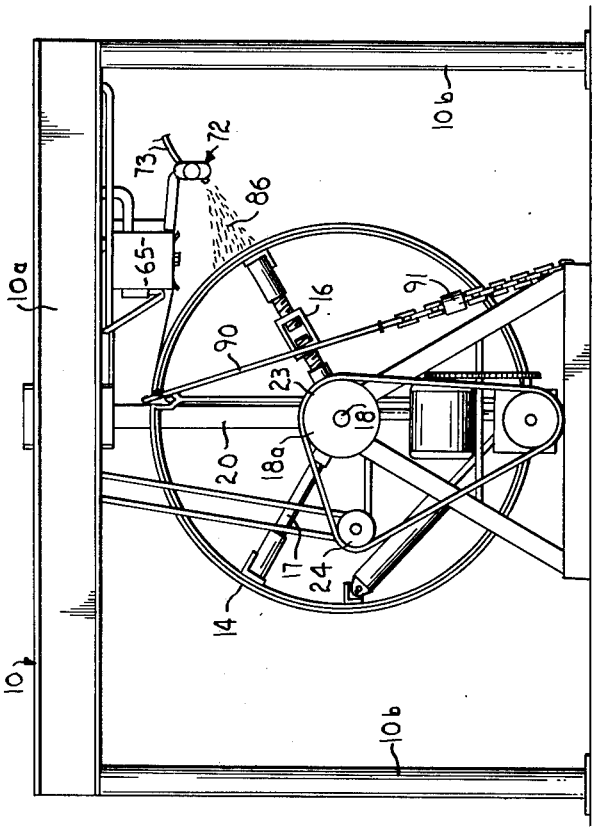
FIG. 5 is an end elevational view taken from the aft end of the winder apparatus and showing the various drive linkages for the form and applicator.
Figure 2:
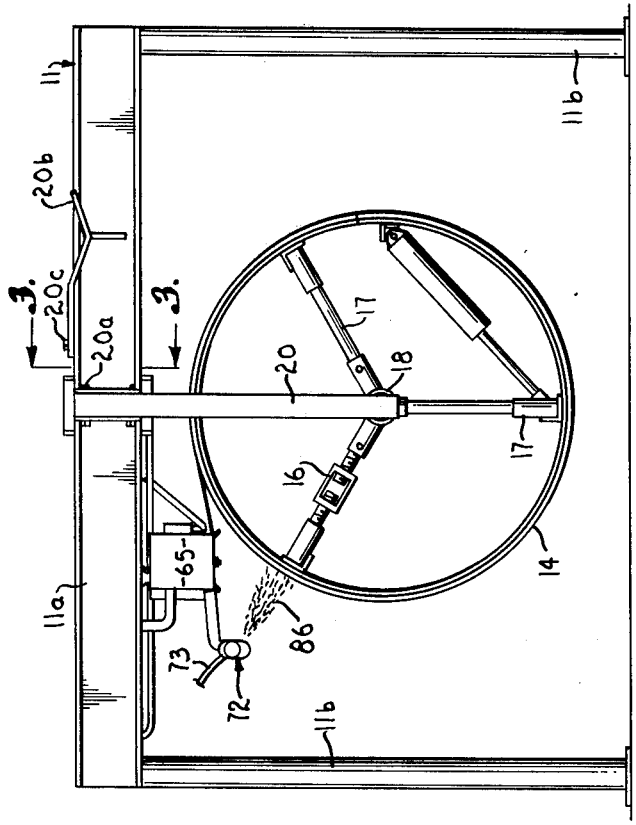
FIG. 2 is an end view of the winder apparatus showing the collapsible form support legs and the applicator applying both the band of glass fiber strands and chopped fibers to the form.

Turning now to the drawings and more particularly to FIGS. 1, 2 and 5, reference numeral 10 generally represents the aft end section of the support framework for the winder apparatus. Numeral 11 depicts the forward end section with a horizontally oriented I-beam 12 spanning the two end sections at substantially the upper center portion thereof. Further, the aft end section will include an I-beam 10a supported by two vertical legs 10b. In a similar manner, the forward end section 11 will include the forward transverse I-beam 11a and the forward support legs 11b. In actual practice, the center I-beam 12 will to support the applicator carriage 13, which is shown in detail in FIG. 4, and the chain drive which facilitates the movement of same.

The cylindrical corrugated form is generally indicated by the numeral 14. As suggested above, this form is collapsible (see FIG. 10) in that the air cylinder(s) 15 may be retracted to pull one end portion of the form 14 inwardly toward the axis of same thereby substantially reducing the diameter and permitting the hardened part formed thereon to be removed. In actual practice, the form will have a plurality of air cylinders 15, stiff legs 16 and pivotal legs 17 of variable lengths that will extend outwardly from the rotative axis of the form and which will permit the form to be bolted together to provide a substantially circular end view when the air cylinders 15 (pistons) are fully extended. As will be seen, the retraction of the pistons of cylinders 15 will pull one end portion of the form inwardly when the two portions are unbolted and the pivotal legs 17 with their lock pins pulled to permit the length of same to decease. In any event, the rounded bolt heads (not shown) will be on the exterior surface of the corrugated form with the threaded portions of the bolts extending inwardly into the form so that the nuts may be easily detached (or attached) when the form is readied for appropriate action.

As mentioned above, the corrugated form 14 will be substantially circular when readied to be wound with the glass fiber material and will contain sinusoidal corrugations of a preselected depth which will run continuously from one end to the other. The form is rotated by shaft 18 (having various diameters) which is conventionally interconnected with the legs 16 (and 17). The forward end of form shaft 18 is supported on bearing 19 which depends via bearing support 20 from the I-beam 12. The bearing support 20 is swingably connected by pin 20a to transverse I-beam 11a at the upper end portion thereof and is so arranged to cooperate with the bracket arm 20b. Arm 20b is pin connected at 20c to forward I-beam 11a so that bracket arms 20b will support the bearing support 20 in a substantially horizontal position when the hardened part is to be removed from the form (see FIG. 9).

The shaft 18 is rotated by electric motor 21 which drives gear box 22 with conventional belt 21a. The gear box shaft 22a in turn rotates the drive wheel 18a for shaft 18 by means of the belt 23. Belt 23 likewise rotates drive wheel or sprocket 24 which will initiate the driving of the applicator carriage as will be shown. In any event, the shaft 18 is supported with its axis in a substantially horizontal plane by the bearings 25 on framework 25a and the forward end bearing 19.

Figure 6:
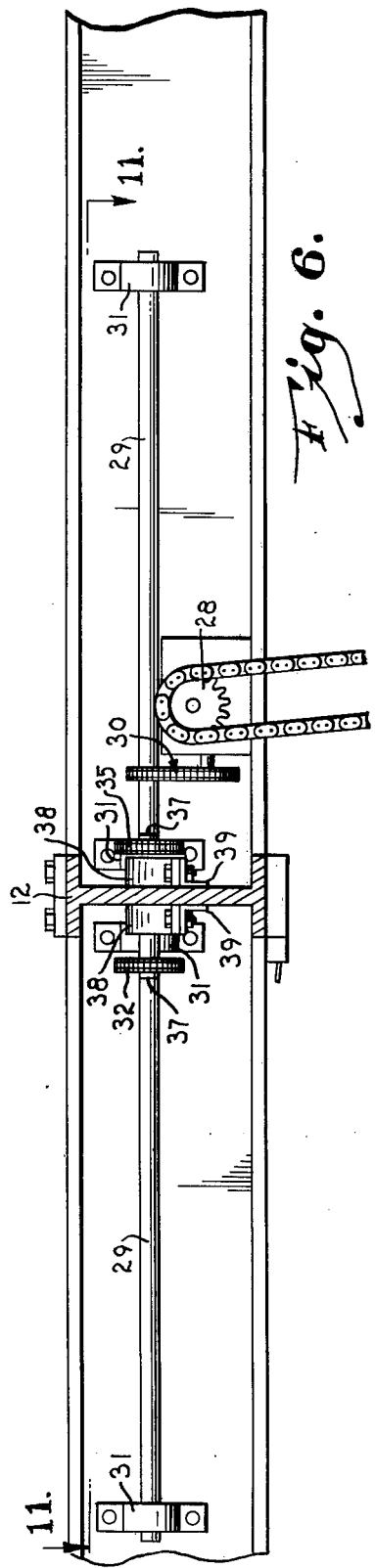
FIG. 6 is an enlarged sectional view taken generally along the line 6—6 of FIG. 1 in the direction of the arrows.

As suggested above, the drive wheel (or sprocket in case a chain drive is used) 24 has a shaft 25 (see FIG. 12) extending substantially horizontally and forwardly therefrom. This shaft goes through a conventional clutch to a forward sprocket 26. Chain 27 (see FIG. 6) connects sprocket 26 and the upper sprocket 28 so as to drive the horizontal shaft 29 through the gears (or chain linked sprockets) 30. The shaft 29 is supported for horizontal rotation on I-beam 10a by the four bearings 31. A sprocket 32 is fixedly mounted on shaft 29 and rotates therewith. This sprocket (32) and sprocket 33 (FIGS. 1 and 33) are interconnected by chain 34 operate to rotate the sprocket 35 shown (in section in FIG. 6) via the rotation of the interconnected sprockets' shaft 37. As further seen in FIG. 6, the sprockets' shaft 37 extends through a suitable opening in I-beam 12 with bearings 38 being located on either side of the vertical web of I-beam 12 and supported by the angle brackets generally indicated by the numeral 39.

The chain 40 (FIG. 3) is linked over sprockets 35 and 41 with the drive for the chain 40 being the above described interconnecting structures. The chain with the correct timing in link and sprocket teeth are important to the laying on of the glass fiber band by the applicator which is in effect moved by the movement of chain 40 co-acting with the applicator carriage 13. Slack in chain 40 may be varied by the conventional screw tightener structure 43 which is capable of moving the sprocket 41 in either the fore or aft direction. In any event, an outwardly extending bolt or rod 44 is weldedly connected to chain 40 and movable therewith to move the applicator carriage as mentioned.

Turning now more particularly to the applicator carriage 13 and the means for moving same on I-beam 12, the carriage is generally constructed of four metal plates which are interconnected to form a rectangular box-like structure. As shown in FIGS. 3 and 4, the flat plate identified by the numeral 42a, has a vertically oriented slot 45 located therein. Flange brackets 46 are located on either side of slot 45 with the outwardly turned web portion thereof being spaced apart for protective purposes. The bolt 44 is extended through slot 45 when the applicator is mounted in place with the nut and lock nut combination 44a securing the applicator carriage 13 to chain 40. In this manner, the upper horizontal throw of the chain moves the applicator carriage from the aft to the forward I-beam position. The bolt 44 is permitted to move downwardly within the slot 45 as same rotates over sprocket 41 and is moved in the aft direction by the lower throw of chain 40 until the bolt 44 rides upwardly within slot 45 around sprocket 35.

The other side plates of the carriage include the top plate 42b, the applicator side plate 42c and the bottom two bars 42d. In order to facilitate the movement of the carriage on I-beam 12, at least two sets of rollers (two rollers per set) generally indicated by the numeral 47, are mounted on spaced-apart shafts 47a which extend between the upper portion of the upright sides 42a and 42c. Side rollers 48 are supported on shafts 48a and operate to contact the outer vertical edges of the upper horizontal flange of the I-beam 12. In actual practice it is contemplated that there will be at least four rollers 48 with two on each side of the upper portion of the I-beam and with brackets 49 weldedly connected to the appropriate sides (either 42a or 42c) to facilitate the mounting of the rollers 48 and the location of their appropriate shafts 48a. In a somewhat similar manner, the two rollers 50 are fixed to each one of the bars 42d and contact the lower vertical edge of the horizontal portion of I-beam 12. The dimension of the side plates 42a and 42c will be such that the two spanning bars 42d are not in frictional contact with the lower surface of the I-beam 12. Of course, these rollers are conveniently mounted by appropriately formed shoulder bolts 50a to provide the rotating shaft surface or some other convenient device with an appropriate lock nut or attachment means being located thereon.

The above described applicator carriage will effect the fore and aft movement necessary along the I-beam 12 and will move in the proper timed relationship with respect to the rotation of the form by the sprocket and chain means described in detail. As further suggested, the applicator will be attached to the carriage structure at the lower left hand corner of same (when viewed from the front). FIGS. 2, 4, 7 and 8 indicate how the horizontal plate 55 is weldedly connected to the lower portion of the applicator plate 42c and extends therefrom with an angle bracket 56 affixed on the end thereof. This angle bracket 56 provides a support surface for arm 57 which extend angularly downwardly therefrom for locating the resin and catalyst pot which will be described in more detail later. Also, a triangularly shaped (when viewed from above as in FIG. 7) strand guide generally identified by the number 58 is bolted to the upper portion of the applicator plate 42c at 58a. This strand guide has a plurality of upwardly extending pins 59 which enable the strands of glass fiber to be looped thereover in order to guide same into the pot. A generally circular guide 60 with pins 60a is weldedly supported on the upper surface of the angle bracket 56 and is located in a triangular shaped guide 58. The circular guide 60 and its associated pins likewise provide a means to direct the various strands into the resin pot.

As shown in FIG. 7, rolls or packages of glass fiber strands are generally represented by the numeral 61 with the individual strands having the designation 62. It is contemplated that the number of rolls and strands may be varied according to the size of band that is desired to be laid on the rotative form and that the broken lines, depicting certain rolls and strands, are merely indicative of the fact that no special number is absolutely necessary. In fact, the device could conceivably work with but a single strand or more than a hundred, so long as the pot could accommodate such a large number and that the rotative speed, angle of application, and width of the applied band properly correlated.

Turning now more particularly to the construction of the resin pot, reference numeral 65 is used to generally indicate same (see FIGS. 4 and 8). The pot will have a rectangular channel 66 welded on the side thereof and will be suitable to accommodate the upturned end of arm 57. This upturned end (57a) slidably fits within the channel 66 and provides a means for removably attaching the resin pot to the applicator. The pot will be constructed of a stainless steel or aluminum and will have an inner ring 67 which will be spaced a few inches from the top surface in order to hold the glass fiber strands outwardly away from the sides of the pot for the purpose of wetting both front and back of the strands in the resin pot. The side of the pot opposite the channel mount 66 will include a mounting channel 67 weldedly connected thereto. The channel will have a slightly necked down end portion to telescopingly receive the similarly shaped element 68 thereon which has a right angle arm 69 weldedly connected thereto and supporting the catalyst and resin sprayer generally identified by the numeral 70. The conventional angle structural 71 is bolted to the lower portion of the channel support 67 at 71a and will provide a means for mounting the chopper and sprayer 72 thereon. Bolt 72a fixes the chopper and sprayer at the appropriate angle with respect to the rotating form. A single strand of glass fiber is fed to chopper 72 and is chopped and is sprayed onto a form and may be appropriately turned on, off, or regulated according to volume or utilized only when needed or in the proportions needed with the rest of the winding process.

An inverted plastic jug or similarly shaped item 75 will be placed over the end portion of the catalyst and resin mixer-sprayer 70 with the neck down or outlet end portion 75a in communicating relationship with the upper end portion of the resin pot 65. In this manner, the mixed catalyst and resin in the proper desired and variable portions are sprayed into the inverted jug 75 in aerosol form but permitted to liquefy as the aerosol spray impinges on the side of the jug and drain into the resin pot in the properly mixed relationship. A substantially flat bar 76 with an aperture in one end portion extends inwardly from the upper inside of the resin pot 65. This aperture will accommodate an elongated externally threaded bolt 77. A rubber diaphragm cover 78 will be sized larger than the ordinarily lower open end of pot 65 and will substantially seal same to preclude any of the liquefied resin and catalyst (hereinafter identified by the numeral 79) from inadvertently flowing outwardly therefrom. This rubber diaphragm 78 is held in place by the combination of the circular plate 80 and the nut 81 which threadably engages the lower end portion of the bolt 77. The sealing pressure of the diaphragm against the lower edges of the resin pot 65 may be altered by adjusting the nut 81. Accordingly, the glass fiber strands are played into the resin pot, across ring 67 and through the liquid 79 and back out between the lower edge of the resin pot and the upper surface of a portion of the rubber diaphragm 78. This device effectively "wets" the strands in a band and permits the proper amounts of resin and catalyst liquid to be applied thereto since the diaphragm will wipe controlled amounts of liquid from the strands before the band is applied to the form.

It is contemplated that a number of hoses H will be utilized to operate the catalyst and resin sprayer 70 and that these will be supported on a wall-mounted boom (not shown) which is movable with the applicator carriage so as to preclude the hoses and glass fiber strands from becoming inadvertently intertwined.

As suggested above with respect to the construction of the resin pot, the glass fiber strands 62 are essentially passed through the pot, wiped to the desired amount of resin and catalyst coating and are played out therefrom in the form of a band identified by the numeral 85. During certain portions of the winding operation, the chopped fiber from sprayer chopper 72 will be directed onto the surface of the wet coated glass fiber band 85. These chopped fibers are diagrammatically represented by the numeral 86 in FIG. 5.

In operation, the method and apparatus is first utilized by assembling the form and by properly orienting and draping the glass fiber strands through the appropriate strand guides and into the resin pot. The form is assembled as described above with the hydraulic or air cylinders extended and with the end portion of the collapsible form appropriately bolted to form a substantially circular (when seen from the end) cylindrical corrugated form. The usual practice requires that a wax similar to a paste floor wax be applied to the form every fourth time that it is utilized. With the band 85 coming out of resin pot 65, it is initially tied to the inside of the aft end of the rotatable form. For convenience, there will usually be a notch cut in the form so that the initially dry band of fiber strands may be easily located in place. At this time, the resin pot 65 is filled with a combination of resin and catalyst mixture by turning on the sprayer 70. Either the amount of resin or catalyst may be controllably varied by the conventional sprayer 70. The aerosol type spray, as it impinges on the side of the inverted jug 75, will eventually liquefy and fill within the resin pot to a desired level. It has been found that a rather constant stream of appropriately mixed liquid will continually flow into the pot during the operation of the winder apparatus with the above described structure. The form is then rotated by turning on the electric motor. At this time, the chopper and sprayer 72 may also be initiated so that chopped glass and the wetted glass fiber band may be applied simultaneously to the form. Approximately 13 passes, up and back, will be made with the applicator applying a spiral pattern wrap on the form as the applicator moves. In this manner, the catalyst delivered to the resin pot for wetting the glass fiber band is usually increased as the winding operation continues so that the hardening time for the layer applied glass fiber band is decreased.

A significant part of the invention resides in the ability to wrap the band of glass fibers onto a continuous corrugated form without bridging over the corrugations. This wrapping process is facilitated by carefully correlating the speed of the rotating form with the speed and the distance travelled by the applicator and the angle at which the band is applied to the form. Since the form rotating at a preselected speed, there is a physical position on the form at which a corrugation "valley" will be as high or higher than the top portion of an adjacent corrugation ridge. Therefore, the application of the band to the form under a slight amount of pressure causes the band to fill in the corrugation valleys and flatten over the adjacent ridge and subsequent valley without any bridging over since at the time of application to the form, the valley and ridge were at substantially equal elevations. As a result, a spiral wrap is accomplished around the corrugated form approximately every 24 to 30 inches with a complete revolution of the form and a number of completed spirals will result from the time that applicator begins at the aft end of the form until it has moved to the forward form end and returned to the rear thereby completing one pass. By selecting the appropriate number of links in the chain and width of the band, the second pass will cause the band to abut the first pass thereby having the cumulative effect of wrapping the entire form without any substantial overlay of the applied bands.

As suggested above, thirteen passes are made with the chopped glass being applied simultaneously with the spiral wrapping of the wetted band of glass fiber strands. After the thirteenth pass, the chopper is shut off with only the band being wrapped on the form for thirteen more passes.

After the first thirteen passes have been made it has been found that an adjustment should be made to the catalyst so that a higher setting is used thereby applying more catalyst to the resin so as to enable the part to "set up" faster. After a total of eighteen passes (5 after the first thirteen) the catalyst content again is adjusted upwardly. Four passes later (after a total of 22), the catalyst will again be increased. Finally, after 26 passes the form may be banded at any potential seam location in the corrugated form. If the corrugated form has no seams, the banding is not absolutely necessary but it has been shown that the location of the bands at every 24 or 25 inches has the effect of strengthening the entire part.

At this time, any excess resin and catalyst which may be in the combined glass fiber band and chopped glass is removed. For this process, a mating corrugated tool may be utilized to "squeegee" the excess liquid off the form as the form is still rotating. Once the banding has been completed and the excess liquid removed from the form and part, the form is stopped, and the band of glass fiber strands cut from the applicator and tied to the form. The form will then be rotated until the resin hardens. At this point, the form bolts will be unscrewed, the tied band of fiber glass strands will be cut and the hardened part will be broken away from the form by collapsing the form as described above and in some cases delivering a compressive blow to the upper portion of the hardened part. The stiff legs 16 will usually be directed to the ground level during the initial breaking away of the hardened part and then rotated so that they are substantially pointing upwardly. A winch operated cable may be attached to the forward end of the hardened part and easily pulled from the remainder of the form. The glass fiber hardened part is light enough so that one man may handle same, however some support will be needed when the bearing support 20 is raised to the position shown in FIG. 10. At this time, a cable 90 with a large hook on the end portion thereof may be used to engage the forward portion of the form shaft 18. A chain tightening boom 91 tightens cable 92 gives sufficient support to the form rotatable shaft during the hardened part removing time even though the forward shaft end is unsupported.

With respect to the resin utilized in the above described process, selected color pigments are utilized therewith. The color pigments are conventional pigmentation commercially available and will result in the hardened part having an attractive appearance. However, the color pigments that are utilized with the resin have been found to enable calcium carbonate to be suspended in the resin and not precipitate to the very bottom of the resin drum. Accordingly, the color pigments provide for a substantially improved utilization of resin and catalyst during a filament winding process. This feature in combination with the resin pot and scrapper diaphragm give positive control at any interval in the winding process over the amount of resin and catalyst being applied to the glass fiber material.

From the foregoing, it will be seen that this invention is one well adapted to attain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. The method of filament winding on a cylindrical form to thereby form a cylindrical part, said method including the steps of
    causing relative motion between said form and a glass fiber applicator,
    continuously delivering liquified resin and catalyst to a receptacle to combine the resin and catalyst,
    applying said combined liquified resin and catalyst in said receptacle to a glass fiber band,
    varying the proportional amount of catalyst to resin that is applied to said glass fiber band at preselected times during the filament winding operation,
    wrapping said glass fiber band with said resin catalyst combination coating thereon on said form in a spiral pattern,
    permitting said glass fiber to harden on said form thereby forming said cylindrical part, and
    removing said hardened part from said form after a predetermined period of time.

2. The method as in claim 1 wherein said step of causing relative rotation includes the step of rotating said form.

3. A combination as in claim 1 including the step of simultaneously applying chopped glass fiber to said form as said band is being wrapped thereon.

4. The combination as in claim 3 including the step of removing excess resin from said form prior to said part being permitted to harden.

5. The combination as in claim 4 including the step of rotating said form while part is hardening thereon.

6. The combination as in claim 1 including the step of adding a color pigment and calcium carbonate to said resin.

7. The combination as in claim 1, wherein said wrapping step is performed on a corrugated form and wherein said wrapping is performed without bridging over the corrugations in said form.

8. The combination as in claim 1, including the step of producing an aerosol mixture of catalyst and resin, liquifying said aerosol mixture of resin and catalyst prior to delivering same to said receptacle.

* * * * *